United States Patent Office 3,405,002
Patented Oct. 8, 1968

3,405,002
CRYSTALLINE GLAZED CERAMIC CONTAINING LEAD TITANATE CRYSTALS AND METHOD
Francis W. Martin, Painted Post, N.Y., assignor to Corning Glass Works, Corning, N.Y., a corporation of New York
No Drawing. Filed Oct. 27, 1964, Ser. No. 406,870
17 Claims. (Cl. 117—125)

ABSTRACT OF THE DISCLOSURE

An improved thermally devitrifiable sealing glass comprising from 60% to 80% PbO, from 18% to 25% $TiO_2$ and from 6% to 12% $SiO_2$, especially adapted for glazing ceramic bodies having coefficients of thermal expansion less than about $50 \times 10^{-7}$. Upon devitrification the glass separates into a vitreous phase and a crystalline phase, said crystalline phase being substantially uniformly distributed through the vitreous phase and constituting at least about 75% by volume of the glaze, said crystalline phase being composed of lead titanate crystals having a cubic lattice structure.

---

This invention relates to a method of glazing ceramic articles, particularly glassware. It is especially concerned with the glazing of articles characterized by an average thermal coefficient of expansion below about $50 \times 10^{-7}$. The invention is also concerned with a novel method for utilizing thermally devitrifiable sealing glasses as glazing frits and with glasses particularly adapted for producing such glazes.

A ceramic glaze is a continuous vitreous coating applied over and fusion bonded to all or part of a ceramic surface. It is commonly employed on glass and other ceramic ware for protective, marking or decorative purposes.

The basic ingredient of a glazing material is a low melting vitreous frit. This is normally pulverized by ball milling prior to application to the surface to be glazed. It may have physically incorporated therewith during milling a minor addition of colorant and/or opacifying agent depending on the purpose of the glaze. The glazing operation customarily involves forming a slip or suspension of the pulverized glaze, with or without a mill addition, in a suitable vehicle. The suspended material is applied to the surface to be glazed by screening or the like and is then fired on a suitable schedule to mature the glaze, i.e., to soften the glass frit and fusion bond it to the underlying surface.

Commercially available glazing and enameling frits generally have an average thermal coefficient of expansion below their setting points on the order of $80-120 \times 10^{-7}$ units. Such frits are particularly adapted to use in the enameling or ferrous metals and in the glazing of ordinary soda-lime glass articles. However, when applied to lower expansion ware, particularly thin blown borosilicate glassware having an average thermal coefficient of expansion of from about 30 to $50 \times 10^{-7}$, there is a tendency for the glaze to craze on cooling and result in serious weakening of the glass article, particularly in response to internal impact. It is possible to lower the expansion characteristic of such frits by composition changes, but attempts in this direction have generally resulted in such an increase in firing or maturing temperature that glass ware tends to deform.

Thermal coefficient of expansion is stated in units per ° C. whenever used in the present specification and claims and is an average value over a selected temperature range. While the actual effective range is below the setting point of a glass, the usual practice is to state the average expansion coefficient over a temperature range of from 0° to 300° C., there usually being no more than a small difference in values, e.g., 15%. Therefore, unless otherwise indicated, such range is intended.

A thermally devitrifiable sealing glass is a glass capable of forming a vitreous seal, such as a glaze on the surface of a preformed body and thereafter undergoing a thermally induced, nucleated type of crystallization by further heating at or near the sealing temperature, whereby the glass separates into a crystal phase and a glassy phase, the former being in the form of relatively fine crystals uniformly dispersed throughout the sealing material and providing a material of essentially uniform physical characteristics ordinarily differing from those of the original glass.

Thermal devitrification of the present type differs from opacification both in the crystallization involved and in the effect of such crystallization on the physical characteristics of the glass, particularly its viscosity characteristics. In an opal glass, the opacifying ingredient, e.g., sodium fluoride or calcium phosphate, is dissolved in a base glass during melting of the glass and is precipitated therefrom during cooling. The opacifying particles normally constitute on the order of 5% or less of the glass and their precipitation causes no significant change in the properties of the base glass other than the characteristic change in light transmission.

I have recently found that certain thermally devitrifiable glasses undergo such a decrease in thermal coefficient of expansion during crystallization at temperatures below 650° C. as to render these glasses highly effective in the glazing of low expansion ceramic materials, particularly borosilicate glassware. The thermally devitrifiable glasses of the invention are lead silicate type glasses containing titania ($TiO_2$) as an essential ingredient and are characterized by the development of a perovskite form of lead titanate crystal at temperatures of around 600° C. In the course of developing these glasses as glazing materials, it was observed that a different form of lead titanate crystal separated initially and was then converted to the perovskite structure upon further heating. This initial crystal form, hitherto unknown, imparted a bright yellow color to the material and was shown by X-ray studies to have a cubic lattice structure. Stress mismatch studies also indicated that this type of crystal had a markedly higher coefficient of expansion than the perovskite form and hence was apparently undesirable insofar as development of low expansion sealing characteristics was concerned. With a $TiO_2$ content of 18% and above, the temperature of heat treatment required to convert the cubic lead titanate crystal to the perovskite form became so high as to render such glasses of little apparent interest for low expansion glazing purposes. In particular, when such lead sealing glasses were applied as glazes on borosilicate glassware having an expansion of about $33 \times 10^{-7}$, severe checking was observed in the glaze and the underlying glass.

Quite unexpectedly, however, I have found that such glazed ware is not as seriously weakened as would be expected from the checking that occurs and from the measured expansion mismatch, provided that the amounts of glassy phase constituents in the glass composition are limited so that a sufficiently large crystal content is developed in the sealing material during thermal devitrification. Glassy phase constituents are those oxide constituents of a thermally devitrifiable glass which normally enter the glassy phase, at least in large part, during separation of the crystalline phase. In the sealing glasses of interest, such constituents are those other than lead oxide and titanium oxide, and are primarily silica, boric oxide and alkali metal oxides.

It is a primary purpose of this invention to provide a novel method of glazing glass and other ceramic articles, particularly articles having an expansion below about $50 \times 10^{-7}$ units. A further purpose is to provide low melting lead silicate type glasses which are particularly adapted to use in this method. Another purpose is to provide a method of glazing and the resulting glazed ware wherein a distinct expansion mis-match exists without serious weakening of the glazed ware. A still further purpose is to provide a glazed article wherein the glaze is characterized by a novel lead titanate type of crystal phase having a cubic lattice structure.

Based on my various discoveries and in accomplishment of the stated purposes, one embodiment of my invention is a method of glazing glass and other ceramic articles having an average thermal coefficient of expansion below about $50 \times 10^{-7}$ which comprises applying to at least a portion of the article surface of layer of PbO-TiO$_2$-SiO$_2$ glass capable of thermal devitrification to form a crystal phase constituting at least 75% by volume of the glass composition and being predominantly a lead titanate type of crystal having a cubic lattice structure, heating the frit-coated article to a temperature within a range of from 550° to 650° C. to form a continuous vitrified layer which is fusion bonded to the surface of the article and, essentially simultaneously, thermally devitrifying the sealing glass to separate the indicated lead titanate crystal phase and thereafter cooling.

The invention further resides in the resulting glazed article, and in thermally devitrifiable sealing glasses composed essentially of from 60% to 80% PbO, from 6% to 12% SiO$_2$, from 0% to 2% B$_2$O$_3$, from 18% to 25% TiO$_2$, from 0% to 2% alkali metal oxides (R$_2$O) and from 0% to 2% Al$_2$O$_3$. In some instances it may also be desirable to add from about 2% to 10% BaO to the composition. Where this is done the amount of PbO may be reduced proportionately.

The present glasses may be melted in conventional manner. Ordinary batch materials, such as red lead, boric acid, pulverized sand and titania are mixed in suitable amounts calculated to produce a glass of desired composition and melted in a platinum crucible or small continuous melting unit at temperatures on the order of 1200–1300° C., until a suitably homogenized melt is obtained. After proper homogenization, the molten glass is preferably quenched by running a stream into cold water or between cold metal rollers in order to avoid premature crystallization within any part of the glass. The glass is then dried and ground to a suitable size for application to a sealing surface either as a slip, or as preformed sealing gaskets or the like. The assembly is then heated on a schedule adapted to burn out or volatilize organic materials and soften the powdered sealing glass to a continuous yieldable layer suitable for forming the desired seal.

The coated ware is then dried and heated to a temperature of from about 550° to 650° C. The precise sealing temperature will depend on the glass composition and will be a temperature sufficient to soften the glazing frit and mature it in known manner. The resulting product comprises a continuous vitrified layer bonded to the sealing surface of the article being glazed. In accordance with the present invention, the selected glazing frit is one capable of rapidly thermally devitrifying as part of the glazing operation, that is, separating into a crystalline phase and a glassy phase. In the crystalline phase, the predominant crystal type is a lead titanate crystal having a cubic lattice structure and imparting a yellow color to the glaze. While this structure may be converted over to a perovskite structure under certain circumstances, the cubic lattice form is stabilized by a relatively large titania content as well as by the presence in the glass composition of minor amounts of one or more alkali metal oxides. For present purposes, it is essetnial that the glassy phase in the devitrified layer is minimized and constitutes no more than about 25% by volume of the glaze.

In formulating the present glasses, it is necessary to maintain PbO within the ranges of 60–80% to provide the desired crystal phase on crystallization and, also to provide a suitable glass for melting and for sealing purposes. At least 18% TiO$_2$ is required to provide the desired crystal formation, while more than 25% serves no useful purpose and is difficult to assimilate into the glass melt, initially. At least 6% SiO$_2$ is necessary to flux the melt and avoid spontaneous devitrification on cooling the glass melt. However, the SiO$_2$ and B$_2$O$_3$ must be restricted so that the requisite high crystal phase content and correspondingly low glassy phase may be attained. Minor amounts of other oxides, particularly the alkali metal oxides (Na$_2$O, K$_2$O, and Li$_2$O) may be present, but again their content is limited to avoid the formation of too much glassy phase.

The following table sets forth a series of glazing frit compositions in weight percent on an oxide basis as calculated from the batch materials:

| | Frit number | | | | | |
|---|---|---|---|---|---|---|
| | 1 | 2 | 3 | 4 | 5 | 6 |
| PbO | 70 | 69 | 69 | 66 | 72 | 70 |
| BaO | | | | 4 | | |
| B$_2$O$_3$ | 1 | | | 1 | | 1 |
| SiO$_2$ | 8 | 7 | 9 | 8 | 8 | 7 |
| Na$_2$O | 1 | 1 | 2 | 1 | | 1 |
| TiO$_2$ | 20 | 22 | 20 | 20 | 20 | 20 |
| Al$_2$O$_3$ | | | | | | 1 |

By way of specific example, a batch was mixed having the following composition in parts by weight, such batch being calculated to yield a glass having the composition of Frit No. 1 above when melted:

| | |
|---|---|
| Red lead | 1075 |
| Litharge | 1050 |
| Sodium carbonate | 51 |
| Boric acid | 53½ |
| Sand | 240 |
| TiO$_2$ | 600 |

The batch was melted in a platinum crucible in an electric furnace at about 1250° C. for 4 hours. The molten glass was quenched in water, and the granulated glass was wet ball milled in alcohol overnight. It was then dried, mixed into a slip of appropriate viscosity for application through a silk screen. The slip was applied to ware having a wall thickness of about 0.060" and blown from a borosilicate glass having an average coefficient of expansion of $33 \times 10^{-7}$. The coated ware was dried and fired by passing through a commercial decorating lehr with a momentary peak temperature of 650° C. The resulting ware had impact strength of about 0.2 unit which is somewhat better than abraded, uncoated ware (0.1–0.2 unit) and much better than commercial enameled ware (0.02–0.04 unit). Firing at 620° C. for one-half hour improved the strength.

Thus, the present invention provides a method and composition for glazing ceramic articles with minimum reduction in impact strength of the resulting article despite interfacial checking and apparent expansion mismatch.

It will be obvious to those skilled in the art that certain modifications and changes may be made in the glazing procedures and materials described herein and in the products formed without departing essentially from the spirit or scope of the invention as expresesd in the following claims.

What is claimed is:

1. A method for glazing a ceramic body having a coefficient of thermal expansion of about $50 \times 10^{-7}$ or below comprising:

applying to said body a vitreous frit consisting essentially of by weight from 60% to 80% PbO, from 18% to 25% TiO$_2$ and from 6% to 12% SiO$_2$, heating said frit to a temperature in the range of from 550° to 650° C. to soften said frit, thus forming a continuous glaze on the surface of said body, continuing to heat said glaze at said temperature for a time not in excess of one hour to devitrify said glaze and to cause it to separate into a vitreous phase and a crystalline phase, said crystalline phase being substantially uniformly distributed through said vitreous phase and constituting at least about 75% by volume of said glaze, said crystalline phase being composed predominantly of lead titanate crystals having a cubic lattice structure, and cooling said glaze.

2. The method of claim 1 wherein said frit further contains from a trace to a 2% by weight of $B_2O_3$.

3. The method of claim 1 wherein said frit further contains from a trace to 2% by weight of an alkali metal oxide.

4. The method of claim 1 wherein said frit further contains from a trace to 2% by weight of $Al_2O_3$.

5. The method of claim 1 wherein said frit further contains from about 2% by weight to 10% BaO.

6. A thermally devitrifiable sealing glass composition for glazing a ceramic body having a coefficient of thermal expansion of $50 \times 10^{-7}$ or below consisting essentially of by weight from 60% to 80% PbO, from 18% to 25% $TiO_2$, and from 6% to 12% $SiO_2$.

7. A thermally devitrifiable sealing glass composition for glazing a ceramic body having a coefficient of thermal expansion of $50 \times 10^{-7}$ or below consisting essentially of by weight from 60% to 80% PbO, from 18% to 25% $TiO_2$, and from 6% to 12% $SiO_2$ and from a trace to 2% of $B_2O_3$.

8. A thermally devitrifiable sealing glass composition for glazing a ceramic body having a coefficient of thermal expansion of $50 \times 10^{-7}$ or below consisting essentially of by weight from 60% to 80% PbO, from 18% to 25% $TiO_2$, from 6% to 12% $SiO_2$ and from a trace to 2% of an alkali metal oxide.

9. A thermally devitrifiable sealing glass composition for glazing a ceramic body having a coefficient of thermal expansion of $50 \times 10^{-7}$ or below consisting essentially of by weight from 60% to 80% PbO, from 18% to 25% $TiO_2$, from 6% to 12% $SiO_2$, and from a trace to 2% of $Al_2O_3$.

10. A thermally devitrifiable sealing glass composition for glazing a ceramic body having a coefficient of thermal expansion of $50 \times 10^{-7}$ or below consisting essentially of by weight from 60% to 80% PbO, from 18% to 25% $TiO_2$, from 6% to 12% $SiO_2$, and from 2% to 10% BaO.

11. A thermally devitrifiable sealing glass composition for glazing a ceramic body having a coefficient of thermal expansion of $50 \times 10^{-7}$ or below consisting essentially of by weight from 60% to 80% PbO, from 18% to 25% $TiO_2$, from 6% to 12% $SiO_2$, and from a trace to 2% of each of the following: $B_2O_3$, an alkali metal oxide and $Al_2O_3$.

12. A glazed article comprising a ceramic body having a coefficient of thermal expansion below about $50 \times 10^{-7}$ and a glaze bonded to the surface of said body, said glaze being a thermally devitrified sealing glass consisting essentially of by weight from 60% to 80% PbO, from 18% to 25% $TiO_2$, and from 6% to 12% $SiO_2$, wherein at least about 75% by volume of said glaze is a crystalline phase uniformly distributed therethrough composed predominantly of lead titanate crystals having a cubic lattice structure.

13. The article of claim 12 wherein said thermally devitrified sealing glass further contains from a trace to 2% by weight of $B_2O_3$.

14. The article of claim 12 wherein said thermally devitrified sealing glass further contains from a trace to 2% by weight of an alkali metal oxide.

15. The article of claim 12 wherein said thermally devitrified sealing glass further contains from a trace to 2% by weight of $Al_2O_3$.

16. The article of claim 12 wherein said thermally devitrified sealing glass further contains from 2% to 10% by weight of BaO.

17. The article of claim 12 wherein said thermally devitrified sealing glass further contains from a trace to 2% by weight of each of the following: $B_2O_3$, an alkali metal oxide and $Al_2O_3$.

References Cited

UNITED STATES PATENTS

| | | | |
|---|---|---|---|
| 2,225,159 | 12/1940 | Deyrup | 117—124 |
| 2,225,161 | 12/1940 | Deyrup | 117—124 |
| 3,113,877 | 12/1963 | Janakirama-Rao | 106—39 |
| 3,189,677 | 6/1965 | Anthony et al. | 106—39 |

ALFRED L. LEAVITT, *Primary Examiner.*

H. COHEN, *Assistant Examiner.*